April 8, 1930.  C. R. SHORT  1,753,582
BRAKE
Filed March 28, 1924   4 Sheets-Sheet 1

Inventor.
CHARLES R. SHORT
By Blackmore, Spencer & Hub.
his Attorneys.

April 8, 1930.    C. R. SHORT    1,753,582
BRAKE
Filed March 28, 1924    4 Sheets-Sheet 2

Inventor.
CHARLES R. SHORT
By Blackmore, Spencer & Flint
his Attorneys.

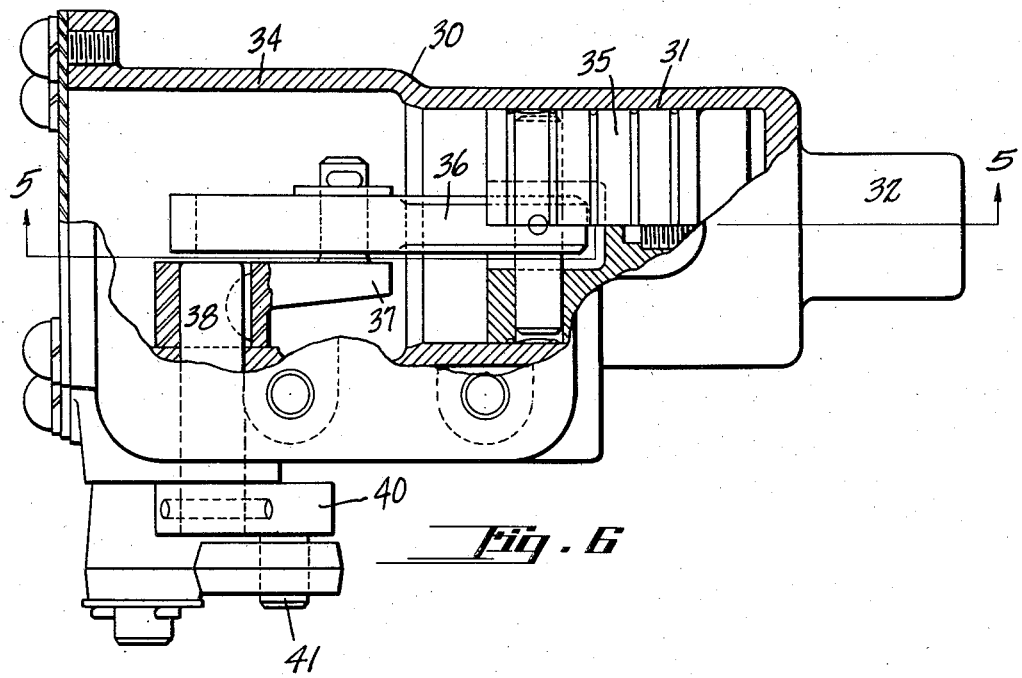
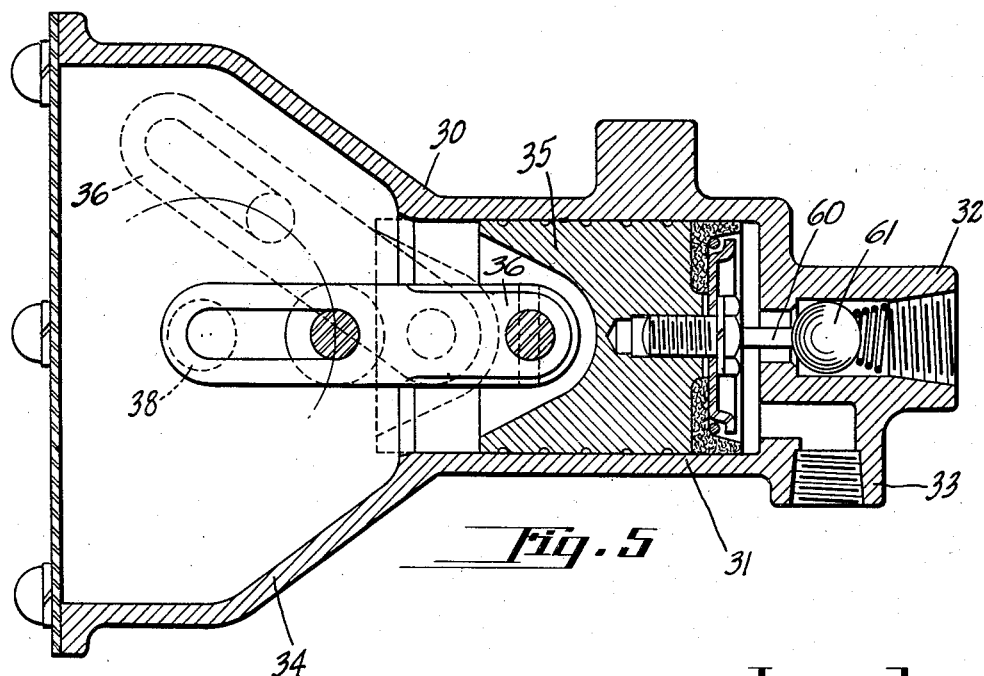

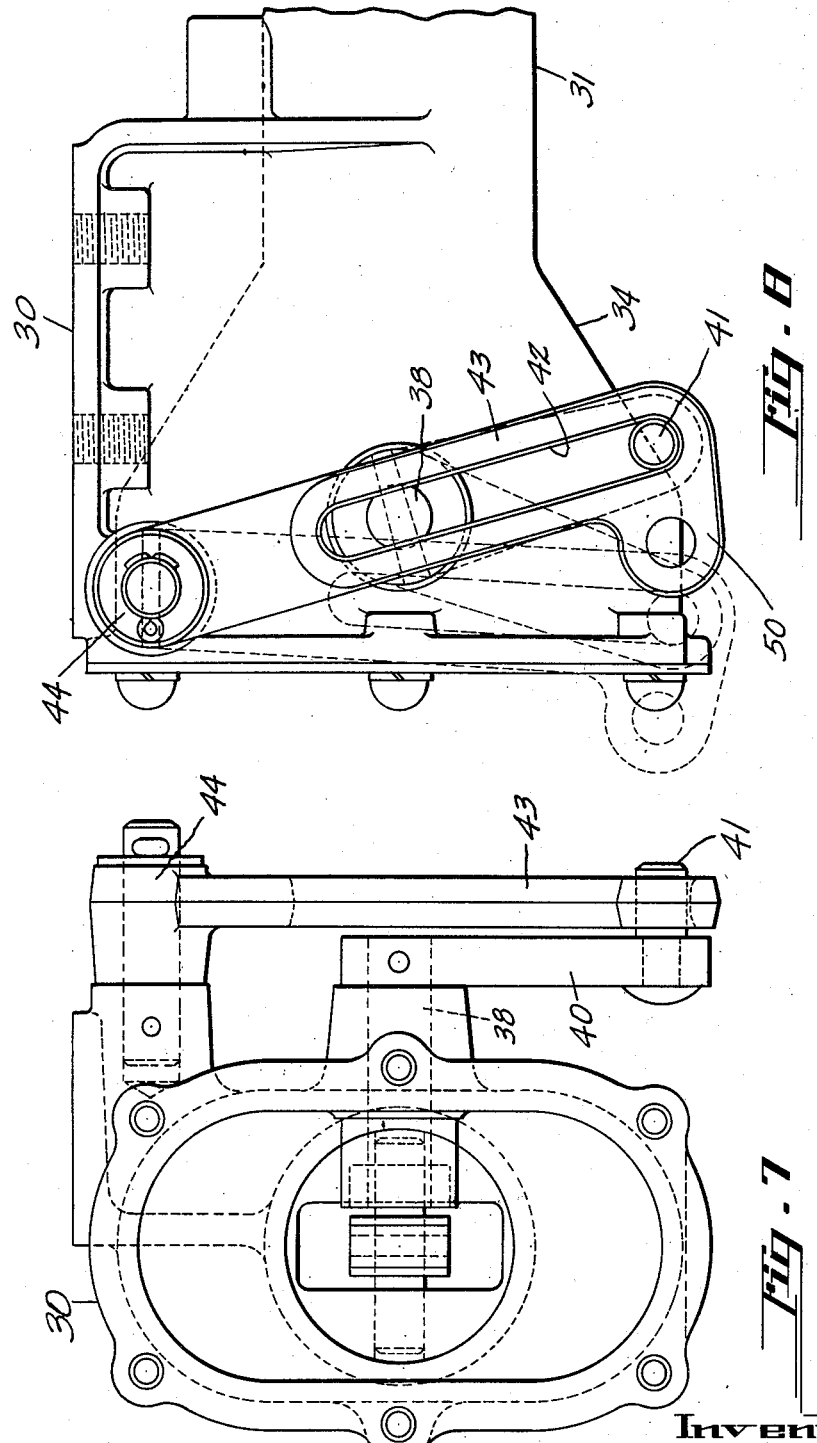

Patented Apr. 8, 1930

1,753,582

UNITED STATES PATENT OFFICE

CHARLES R. SHORT, OF DAYTON, OHIO, ASSIGNOR TO GENERAL MOTORS CORPORATION, OF DETROIT, MICHIGAN, A CORPORATION OF DELAWARE

BRAKE

Application filed March 28, 1924. Serial No. 702,540.

The present invention relates to fluid pressure brakes and more particularly to such brakes as are applied to all the wheels of a dirigible vehicle and wherein a liquid, for convenience referred to as an oil, is used as the pressure transmitting fluid.

When brakes are used upon the four wheels of automobiles, for example, it has been found desirable to apply them equally to all four wheels only when the vehicle is travelling straight. When, however, the direction is to be changed, for example, in rounding a curve, it is quite desirable to decrease or entirely release the braking effect upon the front or directing wheels in order that these may not slip upon the roadway and so lose to the operator the directional control of the vehicle.

Among the objects of the invention therefore, is the effecting of a release of the brakes upon the directing wheels when the brakes have been applied to slow down for a curve and the directing wheels are turned to direct the vehicle upon the curve. In one desirable arrangement the release is controlled by a valve connected directly to the steering column assembly to be operated by manipulation of the steering wheel.

Another object is to reverse this action when the vehicle is redirected to straight forward movement, the brakes having been applied during the series of direction changes.

Further objects and advantages of the present invention will be apparent from the following description, reference being had to the accompanying drawings wherein a preferred embodiment of one form of the present invention is clearly shown.

In the drawings:

Figure 5 is a sectional view of the pressure release device taken on line 5—5 of Figure 6;

Figure 6 is a part section view of the device of Figure 5;

Figure 7 is an end view of the same device with the cover plate removed;

Figure 8 is a side elevation of the same.

Figure 1:
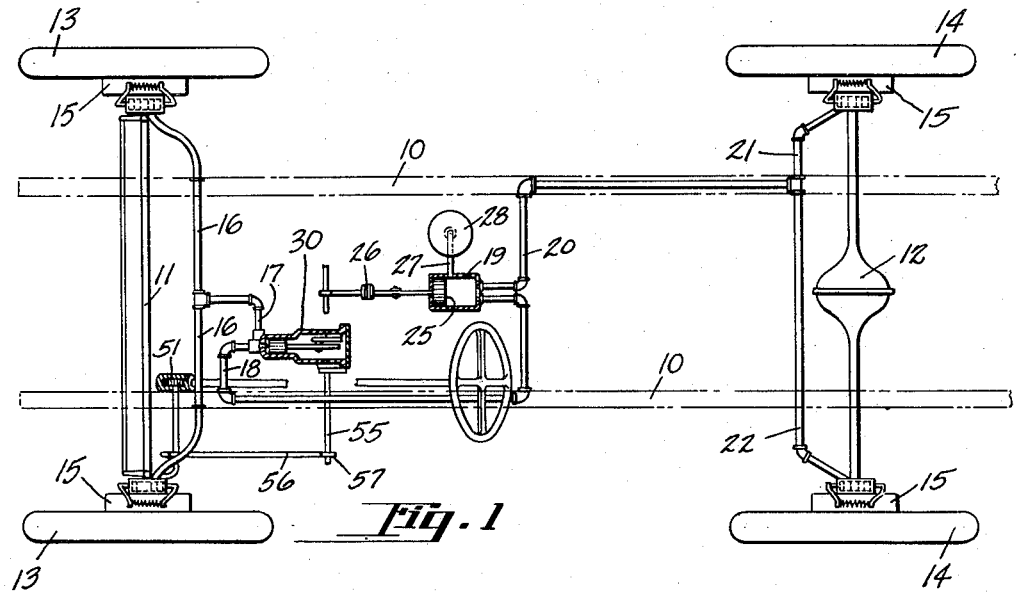
Figure 1 illustrates diagrammatically a plan view of a four wheel brake installation embodying the invention, the wheels being in alinement and the brakes not applied.

Referring to the drawings, 10 represents the frame of an automobile, provided with the usual front and rear axles 11 and 12 respectively, front or directing wheels 13, and rear wheels 14.

Figure 4:
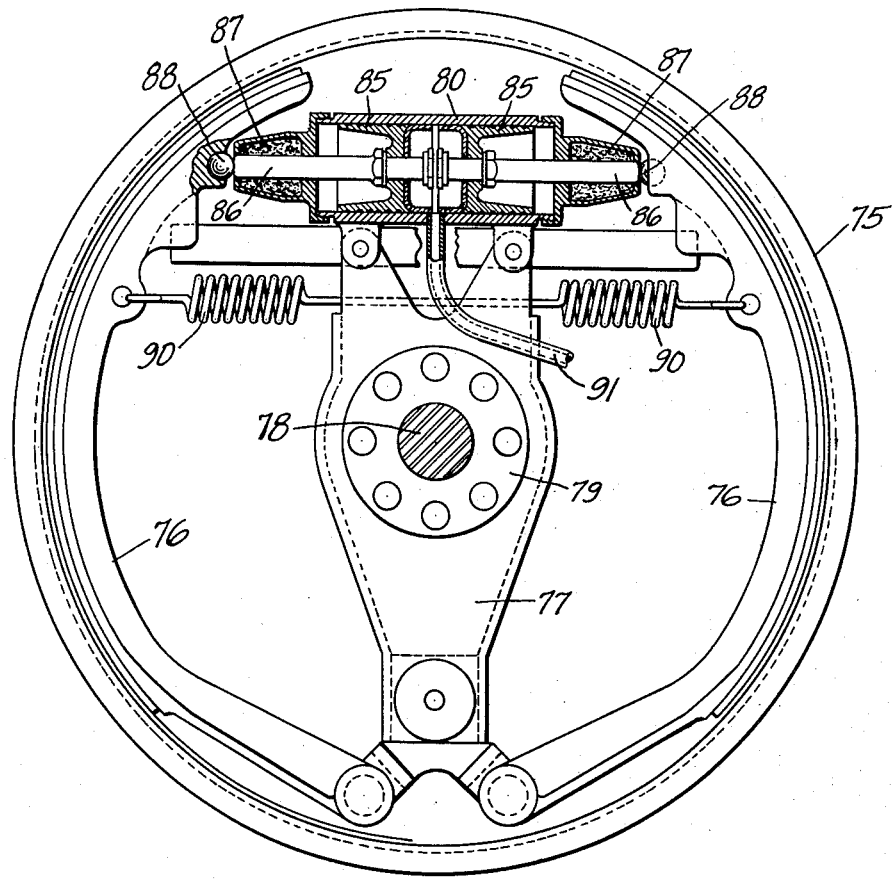
Figure 4 illustrates a type of brake which may be used.

Each of the four wheels is provided with a brake indicated at 15 which may be of the type shown in Figure 4, which has a pipe from the pressure system leading thereto. Suitable flexible connections are included in the pipes leading to the front wheel brakes so as to permit operation of these wheels. The pipes leading to the front wheel brakes are shown at 16. Both these pipes lead from a common pipe 17. Pipe 17 leads from the pressure release device indicated at 30 and shown more in detail in Figures 5 to 8. Another pipe 18 leads from this device to the main pressure cylinder 19, while another pipe 20 leads from the cylinder 19 through branches 21 and 22 to the rear wheel brakes.

The cylinder 19 has therein a piston 25 operable by the pedal 26 to exert pressure upon fluid therein and force it through the pipes 18 and 20 and thence to the brakes. This cylinder is also provided with a lead pipe 27 which connects with a reservoir 28 serving to hold an extra supply of fluid to replenish that lost by leakage. It will be noted that the lead pipe 27 connects with cylinder 19 at such a point that the first portion of the piston travel serves to shut off connection with the reservoir.

Figure 2:
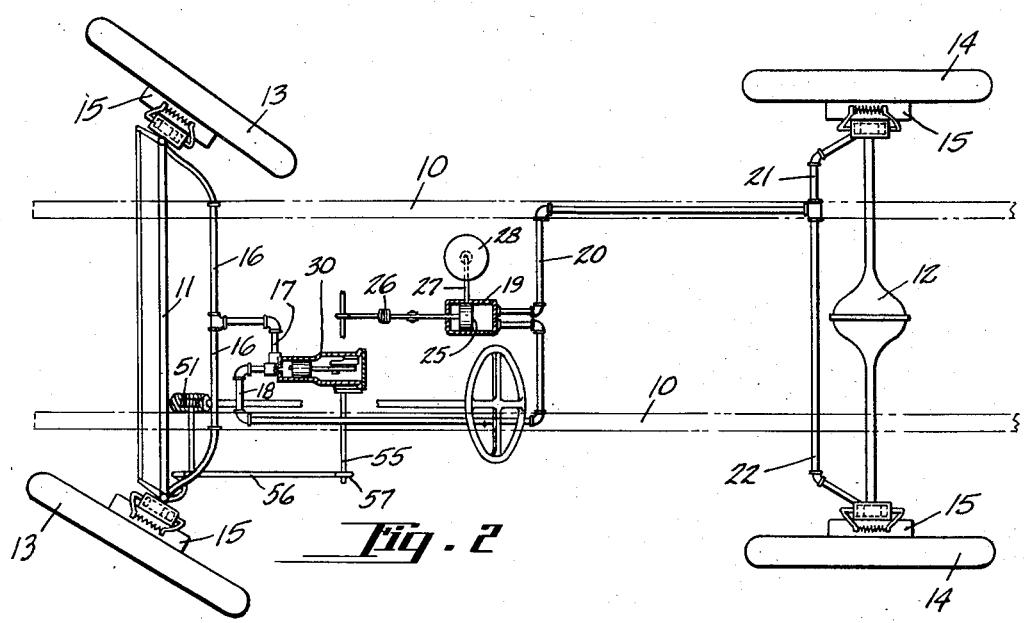
Figure 2 is similar to Figure 1 with the wheels turned and brakes applied.
Figure 3:
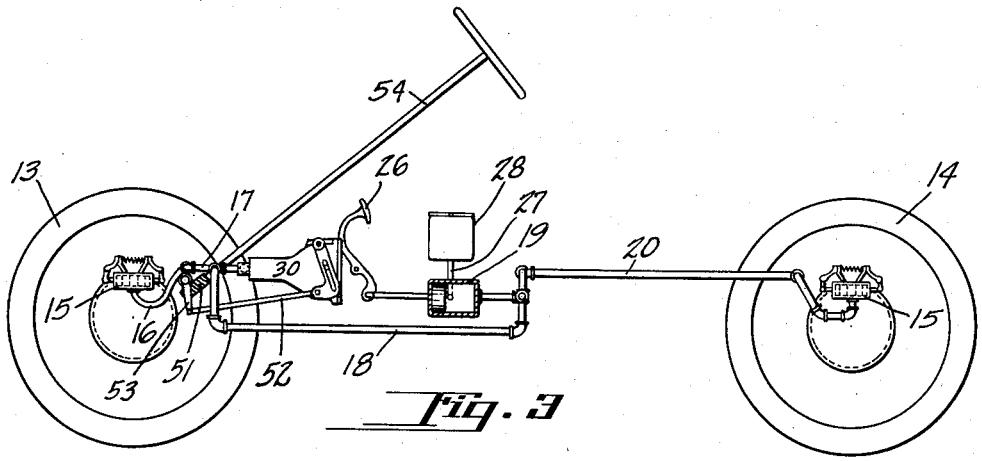
Figure 3 is a side elevation of a modified installation with certain parts omitted for clearness.

Intermediate cylinder 19 and pipe 17 is an automatic pressure release device 30 as has been already mentioned. This device 30 consists of a cylinder 31, (see Figures 5 to 8) closed at one end except for an axial port and pipe connection 32 and a side port and connection 33. The other end of the cylinder is enlarged to provide a housing 34 for crank 37 which through connection rod 36 operates a piston 35 within cylinder 31. Crank 37 is secured to a shaft 38 which extends through the wall of housing 34 and which has upon its outer end another crank 40 provided with a pin 41 which slides in a slot 42 in a lever 43. Lever 43 is about twice the length of crank 40 and is pivoted at its unslotted end 44 to housing 34. This relation of the lengths of lever 43 and crank 40 is desirable so that a small angular movement of the lever results in a much larger angular movement of crank 40. The slotted end of lever 43 is provided with an ear 50, and in the arrangement shown in Figure 3 this is shown as connecting it to the steering apparatus 51 by a linkage such as the rod 52 connected to an arm 53 on the usual horizontal shaft operated by the steering column 54, so as to cause the lever 43 to be moved out of alinement with crank 40 whenever the directing wheels are turned to change the direction of vehicle movement. In Figures 1 and 2, the linkage is indicated as comprising a shaft 55 having a slotted crank engaging a pin carried by the ear 50 of lever 43 and which is revolved by rod 56 secured to a crank arm 57 and to the steering arm of one of the knuckles of the front wheels.

Turning the directing wheels 13, therefore, by means of the steering gear causes the lever 43 to be moved out of alinement with crank 40 and the latter to be revolved, turning shaft 38 and crank 37 out of the position shown in full lines in Figure 5. This operation will permit the piston 35 to move outwardly in cylinder 31 when pressure is applied to the piston head.

Further, the piston 35 carries upon its head a pin 60 which is adapted to project into the passage of connection 32. This passage is provided with a ball check 61, so located, that when the piston 35 and pin 60 are at their innermost position, pin 60 prevents seating of the ball 61 and so keeps the passage open. Movement of the piston outwardly, however, permits seating of the ball and closes the passage.

The operation of the device is as follows: Assuming a straight forward movement of the vehicle, when the brakes are to be applied, the pedal 26 is depressed and consequently the piston 25 is moved rearwardly in cylinder 19. This operation forces oil through the pipes 20, 21, and 22 to the rear brakes. It also forces oil through pipe 18, passage 32, cylinder 35, passage 33, pipes 17 and 16 to the front wheel brakes and applies an equal breaking effort to all of the brakes.

When, however, the front wheels are turned either way from their straight ahead position, while the brakes are applied, through the described mechanism piston 35 is permitted to move outwardly in cylinder 31 under the pressure therein. As soon as the piston 35 has moved a short distance, the ball 61 becomes seated and shuts off communication between cylinder 31 and the pressure cylinder 19.

Further movement of the piston 35 results in the enlargement of the volume of the space in the oil system between valve 61 and the front wheel brakes and so decreases the pressure therein and consequently the braking effect upon said brakes. Upon straightening out the front wheels, the brakes being still in application, the piston 35 will be moved inwardly in cylinder 31 until it produces a pressure upon the oil in this part of the system greater than the pressure in cylinder 19, or until the pin 60 opens the valve 61, whereupon the pressures upon both sides of the valve 61 will balance and the brakes all become equally applied.

On the other hand, it is considered advisable, when the vehicle is in a turn, not to apply the brakes upon the front wheels and the present device also has the function of rendering the front brakes inoperative at such a time. When the piston 35 has been moved or the crank 37 has been moved so as to permit piston 35 to move under pressure upon its head, application of pressure to cylinder 19 will cause immediate seating of valve 61 and so shut off communication with the front brakes.

A convenient form of brake for the front wheels is illustrated in Figure 4. In this figure, the brake drum secured to a wheel is indicated at 75 and internal expanding brake shoes at 76. The latter are hinged at one end to one end of a cross member 77 which is secured to the spindle 78 through a flange 79. Cross member 77 carries at its other end a cylinder 80 within which are opposed pistons 85 whose piston rods 86 pass through suitable packings 87 and press upon balls 88 mounted in the free ends of brake shoes 76, the latter being held drawn toward each and against rods 86 by means of a spring 90 connected to both shoes. Leading into cylinder 80 at a point between the heads of the two pistons 85 is an inlet pipe 91 which may be flexible and, in the present installation is connected to one of the pipes 16. Fluid forced in through pipe 91 will push apart the two pistons 85 and thus apply the brake.

This form of brake is not a part of the present invention which is applicable to any type of hydraulic brake, but has been illustrated merely for convenience and to complete the disclosure.

While the form of embodiment of the invention as herein disclosed, constitutes a preferred form, it is to be understood that other forms might be adopted, all coming within the scope of the claims which follow.

I claim:

1. In fluid pressure brakes for dirigible vehicles having brakes upon the rear or drive wheels and brakes upon the front or directing wheels, all operable through conduits from a common pressure cylinder, means for regulating the braking effect upon the front wheels, said means comprising a valve in the conduit leading thereto, means acting to maintain said valve open during straight line progression of the vehicle, a cylinder with which said conduit communicates, a piston movable within said cylinder, and means operable by and in unison with steering movement of the vehicle for bringing about movement of said piston in a direction to increase the total volume of said conduit, and to cause said valve to close.

2. In a fluid operating means for brakes upon front or directing wheels, for dirigible vehicles, a pressure cylinder; a conduit from said cylinder to a pressure control device, said conduit having a check valve therein; a conduit from the said device to the brake; means for controlling the angular position of the wheels, said means including a steering arm; and a connection between the arm and the said control device for operating the latter; said device comprising a cylinder into and out of which the said conduits respectively lead, a piston movable in said cylinder by means of the connection to the steering arm and having means for opening the said check valve when the piston is in its innermost position and allowing said valve to close when moved from this position, the connection with the steering arm being so that when the wheels are alined with the vehicle, the piston is in its innermost position and when the wheels are turned angularly, the piston is permitted to move outwardly.

3. A pressure release device for fluid pressure directing wheel brakes comprising a cylinder having an inlet and an outlet and having a check valve in the inlet; a piston in said cylinder having a projection adapted to hold open the valve when in innermost position; a slotted piston rod pivoted to said piston; a crank having a pin in its arm cooperating with the slot to move the piston positively inwardly, means connected with the crank and with control mechanism for the directing wheels constructed and arranged to operate the crank to move the piston inwardly when the directing wheels are turned from an angular position to straight forward position and to operate the crank to permit the piston to move outwardly when the wheels are turned from a straight forward position to an angular position.

In testimony whereof I affix my signature.

CHARLES R. SHORT.